US011144360B2

(12) United States Patent
Mann et al.

(10) Patent No.: US 11,144,360 B2
(45) Date of Patent: Oct. 12, 2021

(54) SYSTEM AND METHOD FOR SCHEDULING AND RUNNING INTERACTIVE DATABASE QUERIES WITH SERVICE LEVEL AGREEMENTS IN A MULTI-TENANT PROCESSING SYSTEM

(71) Applicants: Vijay Mann, Bangalore (IN); Ankit Dixit, Bengaluru (IN); Shubham Tagra, Bangalore (IN); Raunaq Morarka, Mumbai (IN); Rajat Venkatesh, Bangalore (IN); Ting Yao, San Jose, CA (US)

(72) Inventors: Vijay Mann, Bangalore (IN); Ankit Dixit, Bengaluru (IN); Shubham Tagra, Bangalore (IN); Raunaq Morarka, Mumbai (IN); Rajat Venkatesh, Bangalore (IN); Ting Yao, San Jose, CA (US)

(73) Assignee: QUBOLE, INC., Santa Clara, CA (US)

( * ) Notice: Subject to any disclaimer, the term of this patent is extended or adjusted under 35 U.S.C. 154(b) by 221 days.

(21) Appl. No.: 16/521,738

(22) Filed: Jul. 25, 2019

(65) Prior Publication Data

US 2020/0379806 A1 Dec. 3, 2020

Related U.S. Application Data

(60) Provisional application No. 62/855,057, filed on May 31, 2019.

(51) Int. Cl.
*G06F 9/50* (2006.01)
*H04L 12/24* (2006.01)
(Continued)

(52) U.S. Cl.
CPC ............ *G06F 9/505* (2013.01); *G06F 9/4818* (2013.01); *G06F 9/4831* (2013.01);
(Continued)

(58) Field of Classification Search
None
See application file for complete search history.

(56) References Cited

U.S. PATENT DOCUMENTS

| 5,603,001 A | 2/1997 | Sukegawa et al. |
| 5,907,675 A | 5/1999 | Aahlad |

(Continued)

FOREIGN PATENT DOCUMENTS

| EP | 1117039 A3 | 9/2005 |
| EP | 2615803 A2 | 7/2013 |
| WO | 2014138745 A3 | 12/2014 |

OTHER PUBLICATIONS

Zhao, et al., "SLA-Based Resource Scheduling for Big Data Analytics as a Service in Cloud Computing Environments", 2015, 2015 44th International Conference on Parallel Processing, pp. 510-519. (Year: 2015).*

(Continued)

*Primary Examiner* — Qing Yuan Wu
(74) *Attorney, Agent, or Firm* — Landmark Intellectual Property Law, PC; Gregory M Murphy

(57) ABSTRACT

The invention is directed to systems and methods for scheduling interactive database queries from multiple tenants onto distributed query processing clusters with service level agreements (SLAs). SLAs may be provided through a combination of estimation of resources per query followed by scheduling of that query onto a cluster if enough resources are available or triggering proactive autoscaling to spawn new clusters if they are not. In some embodiments systems may include a workflow manager; a resource estimator cluster; one or more execution clusters; and one or more metastores. A workflow manager may include an active node and a passive node configured to send a query to the resource estimator cluster and receive a resource estimate. A resource estimator cluster may be in communication with the work- (Continued)

flow manager. One or more execution clusters may be scaled by the workflow manager as part of a schedule or autoscale based on workload.

12 Claims, 3 Drawing Sheets

(51) Int. Cl.
  *G06F 16/2458* (2019.01)
  *G06F 11/34* (2006.01)
  *G06F 9/48* (2006.01)
  *H04L 29/08* (2006.01)
  *G06F 16/242* (2019.01)

(52) U.S. Cl.
  CPC .......... *G06F 9/4881* (2013.01); *G06F 9/5038* (2013.01); *G06F 9/5077* (2013.01); *G06F 11/3433* (2013.01); *G06F 16/2423* (2019.01); *G06F 16/2471* (2019.01); *H04L 41/5016* (2013.01); *H04L 67/1029* (2013.01); *H04L 41/5009* (2013.01)

(56) References Cited

U.S. PATENT DOCUMENTS

| | | |
|---|---|---|
| 6,192,391 B1 | 2/2001 | Ohtani |
| 6,460,027 B1 | 10/2002 | Cochrane et al. |
| 6,601,062 B1 | 7/2003 | Deshpande et al. |
| 6,847,962 B1 | 1/2005 | Cochrane et al. |
| 7,680,994 B2 | 3/2010 | Buah et al. |
| 7,844,853 B2 | 11/2010 | Barsness et al. |
| 7,848,261 B2 | 12/2010 | Fachan |
| 8,260,840 B1 | 9/2012 | Sirota et al. |
| 8,296,419 B1 | 10/2012 | Khanna et al. |
| 8,996,482 B1 | 3/2015 | Singh et al. |
| 9,049,746 B2 | 6/2015 | Periyalwar et al. |
| 9,451,013 B1 | 9/2016 | Roth et al. |
| 9,483,785 B1 | 11/2016 | Corley et al. |
| 9,531,607 B1 | 12/2016 | Pai et al. |
| 9,571,561 B2 | 2/2017 | Jang |
| 9,645,859 B1 | 5/2017 | Dash et al. |
| 9,860,569 B1 | 1/2018 | Wilms et al. |
| 10,069,693 B1 | 9/2018 | Daptardar et al. |
| 2002/0145983 A1 | 10/2002 | Block et al. |
| 2002/0157113 A1 | 10/2002 | Allegrezza |
| 2003/0005350 A1 | 1/2003 | Koning et al. |
| 2003/0065874 A1 | 4/2003 | Marron et al. |
| 2004/0193626 A1 | 9/2004 | Colby et al. |
| 2005/0222996 A1 | 10/2005 | Yalamanchi |
| 2005/0278387 A1 | 12/2005 | Kamada et al. |
| 2007/0094290 A1 | 4/2007 | Oka et al. |
| 2007/0195810 A1 | 8/2007 | Fachan |
| 2007/0294493 A1 | 12/2007 | Buah et al. |
| 2008/0141065 A1 | 6/2008 | Okabe |
| 2009/0043873 A1 | 2/2009 | Barsness et al. |
| 2009/0182779 A1 | 7/2009 | Johnson |
| 2009/0222418 A1 | 9/2009 | Layman |
| 2009/0327854 A1 | 12/2009 | Chhajer et al. |
| 2010/0153482 A1 | 6/2010 | Kim et al. |
| 2010/0306286 A1 | 12/2010 | Chiu et al. |
| 2011/0119449 A1 | 5/2011 | Neerincx et al. |
| 2011/0167221 A1 | 7/2011 | Pangal et al. |
| 2011/0314485 A1 | 12/2011 | Abed |
| 2012/0047339 A1 | 2/2012 | Decasper et al. |
| 2012/0102291 A1 | 4/2012 | Cherian et al. |
| 2012/0151272 A1 | 6/2012 | Behrendt et al. |
| 2012/0215763 A1 | 8/2012 | Hughes et al. |
| 2012/0304192 A1 | 11/2012 | Grove et al. |
| 2013/0110764 A1 | 5/2013 | Wilf |
| 2013/0124483 A1 | 5/2013 | Furuhashi et al. |
| 2013/0132967 A1 | 5/2013 | Soundararajan et al. |
| 2013/0179881 A1 | 7/2013 | Calder et al. |
| 2013/0189969 A1 | 7/2013 | Periyalwar et al. |
| 2013/0204948 A1 | 8/2013 | Zeyliger et al. |
| 2013/0227558 A1 | 8/2013 | Du et al. |
| 2013/0232254 A1 | 9/2013 | Srikanth et al. |
| 2013/0254171 A1 | 9/2013 | Grondin et al. |
| 2013/0290771 A1 | 10/2013 | Kim et al. |
| 2013/0318379 A1 | 11/2013 | Seshadri et al. |
| 2013/0332612 A1 | 12/2013 | Cai et al. |
| 2014/0040575 A1 | 2/2014 | Horn |
| 2014/0059306 A1 | 2/2014 | Bender et al. |
| 2014/0059552 A1 | 2/2014 | Cunningham et al. |
| 2014/0067992 A1 | 3/2014 | Saeki |
| 2014/0095505 A1 | 4/2014 | Blanchflower et al. |
| 2014/0149590 A1 | 5/2014 | Mallipeddi et al. |
| 2014/0156777 A1 | 6/2014 | Subbiah et al. |
| 2014/0189109 A1 | 7/2014 | Jang |
| 2014/0195558 A1 | 7/2014 | Murthy et al. |
| 2014/0279838 A1 | 9/2014 | Tsirogiannis et al. |
| 2015/0222705 A1 | 8/2015 | Stephens |
| 2015/0234688 A1 | 8/2015 | Dageville et al. |
| 2015/0242197 A1 | 8/2015 | Alfonso et al. |
| 2015/0379026 A1 | 12/2015 | Todd et al. |
| 2016/0065627 A1 | 3/2016 | Pearl et al. |
| 2016/0179581 A1 | 6/2016 | Soundararajan et al. |
| 2016/0224638 A1 | 8/2016 | Bestler et al. |
| 2016/0350371 A1 | 12/2016 | Das et al. |
| 2016/0371193 A1 | 12/2016 | Floratou et al. |
| 2017/0337138 A1 | 11/2017 | Li et al. |
| 2018/0159727 A1 | 6/2018 | Liu et al. |
| 2020/0349161 A1* | 11/2020 | Siddiqui ........... G06F 16/24542 |

OTHER PUBLICATIONS

International Search Report for PCT/US2015/045419 completed Oct. 2, 2015; 2 pages.
International Search Report for PCT/US2015/050174 completed Nov. 16, 2015; 2 pages.
International Search Report for PCT/US2015/057003 completed Dec. 13, 2015; 2 pages.

* cited by examiner

SYSTEM AND METHOD FOR SCHEDULING AND RUNNING INTERACTIVE DATABASE QUERIES WITH SERVICE LEVEL AGREEMENTS IN A MULTI-TENANT PROCESSING SYSTEM

RELATED APPLICATIONS

The present application claims priority to U.S. Provisional Patent Application No. 62/855,057 filed on 31 May 2019, entitled "System and Method for Scheduling and Running interactive Database Queries with Service Level Agreements in a Multi-Tenant Processing System," which is incorporated herein by reference in its entirety.

FIELD OF THE INVENTION

In general, the present invention is directed to systems and methods for scheduling interactive database queries from multiple tenants onto distributed query processing clusters with service level agreements (SLAs). More specifically, the present invention may provide SLAs through a combination of estimation of resources per query followed by scheduling of that query onto a cluster if enough resources are available or triggering proactive autoscaling to spawn new clusters if enough resources are not available.

BACKGROUND

Distributed SQL query engines such as Presto or Hive may make use of in-memory pipelined architectures for reducing query latency while trading off query reliability. Typically, enterprise customers run large presto clusters to enable their data analysts and data scientists to issue queries at large scale. This results in a considerable amount of effort and money that is dedicated to keep these clusters running in the cloud.

In order to reduce the total cost of ownership (TCO) by charging each query based on the amount of data scanned, enterprise users are gradually moving to big-data-as-service or serverless interactive query systems. Such systems—including but not limited to Amazon Athena and Google BigQuery—may reduce TCO and may also provide acceptable performance by leveraging elasticity of compute and memory resources on the cloud. Amazon Athena is based on Presto. Hive Metastore may work with any data stored on Amazon S3, and Google BigQuery may allow querying tables that are native (e.g. in the Google cloud) or external. While both these systems may provide acceptable performance, they do not provide any service level assurances (SLAs) in terms of query latency. Furthermore, many of such systems do not allow users to connect to their own custom metastores. System described in this invention attempts to overcome both these limitations.

Accordingly, it is desirable to provide a system that may perform proactive auto-scaling and resource isolation using resource estimation for distributed query processing systems. Moreover, it is desirable to increase query reliability, increase predictability, and lower the overall cost of ownership.

SUMMARY OF THE INVENTION

In accordance with some embodiments of the present invention, aspects may include a system for scheduling interactive database queries from multiple tenants onto a distributed query processing system, while providing service level agreements and assurances, the system comprising: a workflow manager; a resource estimator cluster; one or more execution clusters; and one or more metastores.

In accordance with some embodiments of the present invention, aspects may include a system for scheduling interactive database queries from multiple tenants onto a distributed query processing system, while providing service level agreements and assurances, the system comprising: a workflow manager comprising an active node and a passive node, configured to send a query to the resource estimator cluster and receive a resource estimate; a resource estimator cluster in communication with the workflow manager; one or more execution clusters scaled by the workflow manager as part of a schedule or autoscaled based on workload; and one or more metastores.

These and other aspects will become apparent from the following description of the invention taken in conjunction with the following drawings, although variations and modifications may be affected without departing from the spirit and scope of the novel concepts of the invention.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
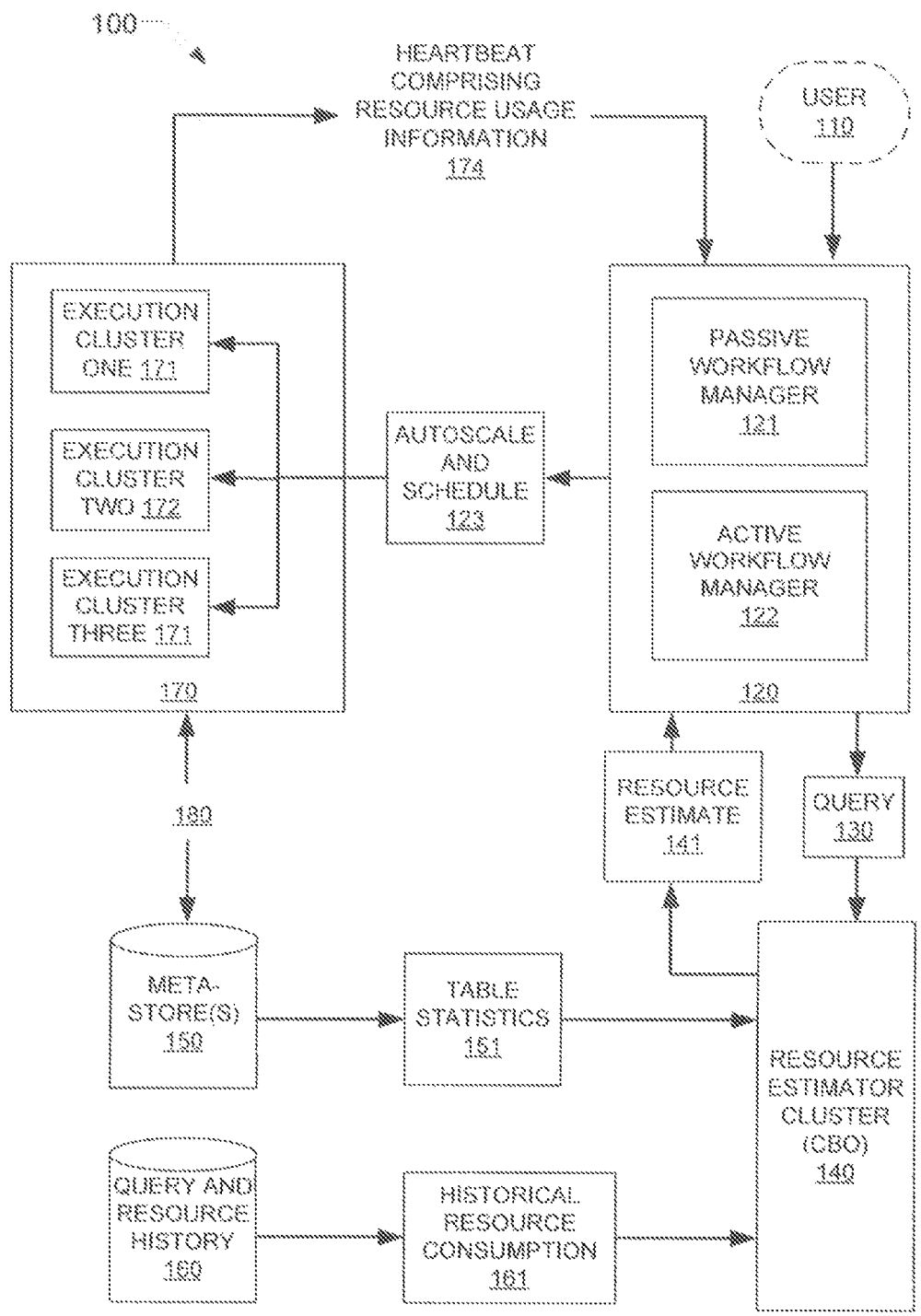
FIG. 1 illustrates an exemplary system architecture, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is generally directed to a distributed SQL query system for big data that can provide service level assurance (SLA) for each query and also allow flexibility to run each query against a different custom metastore. More specifically, the present invention provides systems and methods for scheduling interactive database queries from multiple tenants onto distributed query processing clusters with service level assurances (SLAs). SLAs may be provided through a combination of estimation of resources per query followed by scheduling of that query onto a cluster if enough resources are available or triggering proactive autoscaling to spawn new clusters if enough resources are not available. Multi-tenant query processing systems may also be provided in which each cluster may be used to run queries from any user with each query using a different custom metastore for its execution.

Several advantages over the prior art are quickly recognized. First, query reliability may be increased multi-fold as only those queries that have a probability of finishing successfully based on estimated and available resources are scheduled. Second, more predictable query performance may be achieved, as scheduling ensures that required amount of resources as per estimations are available before scheduling. Thirdly, the overall cost of ownership may be lowered, as queries may be charged on the basis of total data scanned and not based on how long the shared cluster has been running.

With reference to FIG. 1, an exemplary architecture 100 of a system in accordance with some embodiments of the present invention will now be discussed. In general, system 100 may comprises of multiple accounts wherein each account may have many users. Each account may correspond to a tenant. Usage quotas (in terms of maximum concurrent queries or maximum memory or maximum CPU) may be specified per account and can be further specified at the user level. System comprises of a Workflow manager (WFM), a Resource Estimator (Estimator), and one or more execution clusters (EC).

In general, a user 110 may communicate with a workflow manager 120 (comprised of a passive node 121 and an active node 122) to submit a query 130. Query may be sent to a resource estimator cluster (CBO (cost based optimizer) or Estimator) 140, which may receive from a query and resource history datastore 160 historical resource consumption data 161 to assist in its decision making. Estimator 140 may also receive from a metastore 150 table statistics 151. Estimator 140 may return a resource estimate 141 to the workflow manager 120. The workflow manager 120 may then autoscale (if necessary) and schedule (it appropriate) the query on an execution cluster 170, which may comprise one or more execution cluster 171, 172, 173. The execution cluster 170 may also provide and receive information to the metastore 150 to assist in processing. During processing, each EC may provide a heartbeat 174 to the WFM 120, that may comprise actual resource information. In this manner, WFM 120 may be kept apprised of usage information in order to make appropriate scaling and assignment decisions.

Users 110 may run a SQL query (either through a user interface or another program or a business intelligence (BI) tool) against ibis system. A Workflow Manager (WFM) 120 may be deployed in a high availability (HA) configuration with one active node 122 and one passive node 121; and each may receive the user query 130. The query 130 may be queued in the WFM 120 internal queue. Various components within WFM 120 may handle query 130 from that point onwards. WFM 120 may invoke a Resource Estimator cluster 140 (Estimator or CBO) to predict resource requirements for query 130. Estimator 140 may use different techniques for predicting resource requirements for a given query.

In accordance with some embodiments, Estimator may make use of historical resource consumption data for a given query to make future predictions. In another embodiment, Estimator 140 may make use of table statistics and use its knowledge of dependency graph of various subtasks in a query to determine which subtasks can execute concurrently on a single node and thereby estimating the maximum memory required per node. WFM 120, upon receiving the resource predictions 141 for a query 130, may decide the SLA for query 130 based on other concurrent queries (and their resource usage) running in the same account.

In accordance with some embodiments, SLAs may have different levels such as GREEN and YELLOW. For example, GREEN queries may imply that a query is within its account quota and should gel predictable performance from the system. Such queries may be scheduled right away if there is enough spare capacity available in the system for the predicted resource requirements of that query. Such queries may be scheduled on an execution cluster 170, which may comprise multiple execution clusters 171, 172, 173.

A scheduler component may use different heuristics to decide which execution cluster (EC) 170 the query 130 should be scheduled on. In one embodiment, it may decide to pick the EC 170 that will result in the lightest packing (i.e it will pick EC with spare capacity that is closest to predicted resource requirement). This will help the WFM 120 downscale or stop free clusters more aggressively and thereby reduce infrastructure costs. In another embodiment, WFM 120 may decide to schedule the query on an EC 170 that has the most spare capacity available to do better load balancing and achieve better performance for the query. WFM 120 tracks available capacity across all execution clusters 171, 172, 173 through a Spare Capacity Calculator.

In cases, where there is not enough capacity available—and in order to avoid scheduling delays due to the time taken by autoscaling to kick in—WFM 120 may selectively pre-empt (or kill) existing YELLOW queries. YELLOW queries may imply that account to which these queries belong has already exhausted its resource quota and such queries may not get predictable performance from the system. Such queries may be preempted to may space for GREEN queries. Once preempted, these queries may be retried by the system. If the system does not have enough spare capacity WFM 120 may decide to keep these queries in waiting state for some predefined time interval (WAIT_TIME). If other queries running on the system end within WAIT_TIME and required resources become available in any one of the execution clusters (ECs) 171, 172, 173, WFM 120 may schedule the YELLOW query on an EC 170. If enough spare capacity does not become available even after expiry of WAIT_TIME, WFM will invoke its autoscaling module to start another cluster and schedule the pending YELLOW queries on the new cluster.

Figure 2:
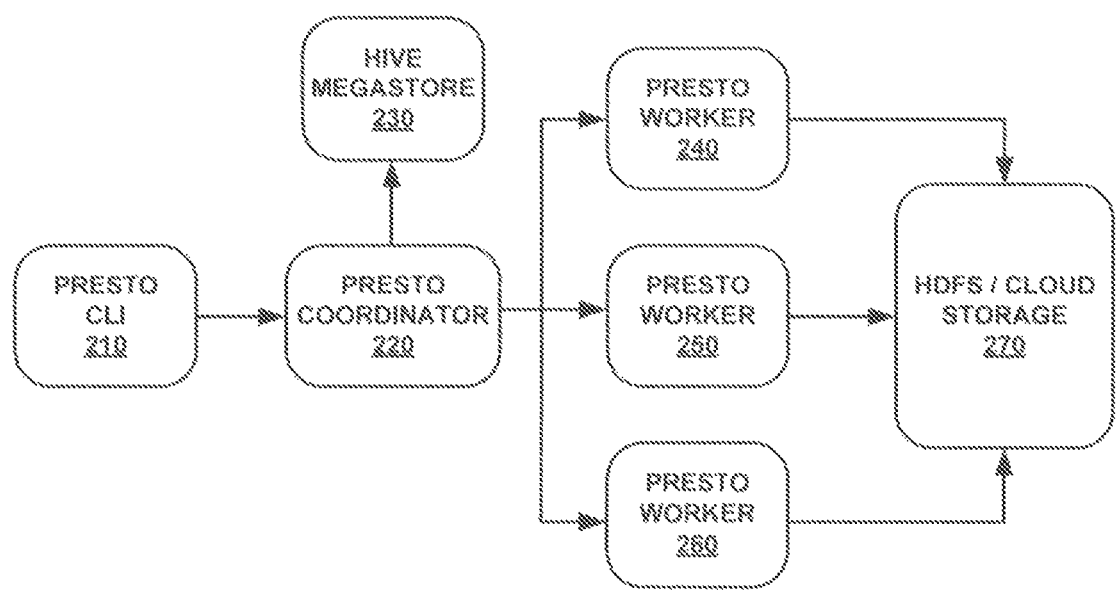
FIG. 2 depicts an exemplary system architecture of an execution cluster, in accordance with some embodiments of the present invention.

Multi-tenancy and multiple metastore support. SQL execution engines such as Presto may have a standard architecture as shown in FIG. 2. This comprises of a client—here Presto CLI 210, a coordinator 220 or master node that communicates with a Hive Metastore 220 using a Hive connector, and a set of worker nodes 240, 250, 260 that read and write data either from Hadoop Filesystem (HDFS) 270 or one of the cloud storage options (S3 for Amazon Web Services (AWS) or BlobStore for Microsoft Azure). Queries are submitted from a client 210 such as the Presto CLI to the coordinator 220. The coordinator 220 parses, analyzes and plans the query execution, then distributes the processing to the workers 240, 250, 260. The Hive metastore 230 stores the metadata for Hive tables and partitions in a relational database, and provides clients 210 (including Hive) access to this information using the metastore service API.

Presto may manage datastores by using connectors, where each connector may hold all objects corresponding to a metastore and corresponding datastore locations and access credentials. Broadly speaking a connector may be a stack corresponding to a data source with data/metadata caches, transaction control with code to contact metastore and data stores. Traditionally, Presto may take information about metastores and access credentials before instantiation and while initializing creates one connector for each one of them.

Typically each customer or user 210 may have its own Hive metastore service 230 and in order to support multiple tenants, a multi-tenant SQL query system may have the ability to dynamically access metastores 230 with credentials provided with the query. This may involve instantiating the entire connector stack (TranactionLayer, CachingLayer, MetastoreClient). Furthermore, queries from one user should not be able to access other user's metastores and data.

In accordance with some embodiments of the present invention, systems may add the ability to pass required information to connect to metastore/datasource with the query. When Presto receives this information, it may cheek if it already has a connector corresponding to the information provided. If it does not, it creates a new one and then uses that to execute the query. Presto may also authenticate each query for connector access. Since current implementation of Presto requires a Thrift server to connect to Hive metastore, this system implements a native client for Presto which may directly talk to the metastore to avoid creation of one new thrift server per new client. In accordance with some embodiments of the present invention, the thrift server itself can be made multi-tenant.

Figure 3:
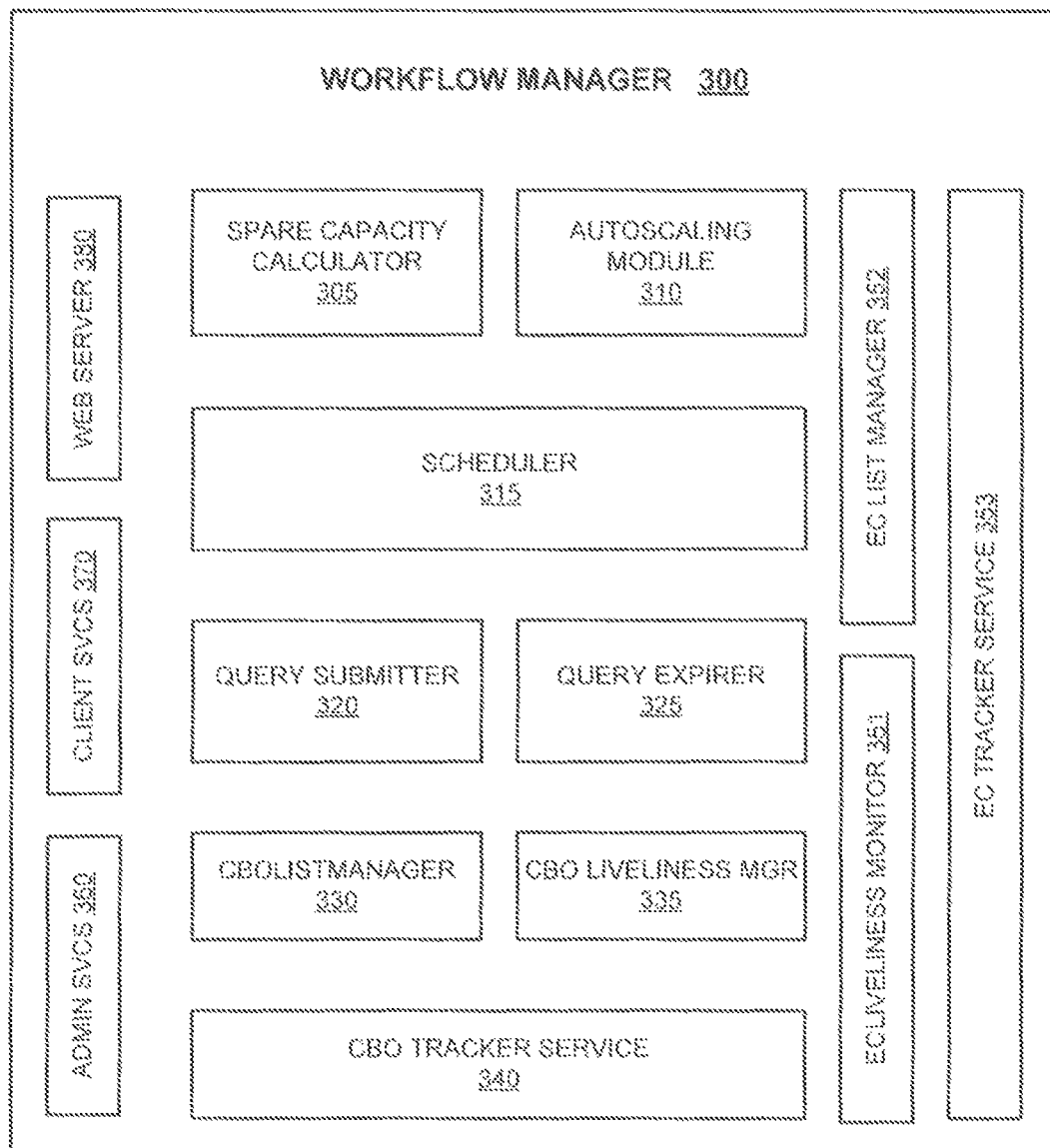
FIG. 3 illustrates components of a workflow manager, in accordance with some embodiments of the present invention.

With reference to FIG. 3, different components within a workflow manager 300 will now be discussed. In general, the workflow manager 300 may comprise: (i) a spare capacity calculator 305; (ii) an autoscaling module 310; (iii) a scheduler 315; (iv) a query submitter 320: (v) a query expirer 325: (vi) a CBO List Manger 330: (vii) a CBO Liveliness Monitor 335; (viii) a CBO Tracker Service 340; (ix) an EC Liveliness Monitor 351; (x) an EC List Manager 352; (xi) an EC Tracker Service 353; (xii) an Admin Service 360; (xiii) a client service 370; and (xix) a web server 380. The functionality of each component is discussed below.

The spare capacity calculator 305 may try to predict how much spare capacity should be kept in the system, based on numerous factors. In accordance with some embodiments, the spare capacity calculator 305 may use historical usage of the system and make a prediction of required resources at any time using linear regression or other machine learning techniques. This may be relevant for maintaining predictability of the queries. Upscaling and/or downscaling decisions made by the autoscaling module 310 may be partially based on determinations of the spare capacity calculator and partially on the predicted resources for a given query.

Autoscaling module 310 may provide upscaling and/or downscaling of both CBO nodes and ECs. The autoscaling module 310 may make decisions based on: (i) spare capacity predictions: (ii) current pending queries; and/or (iii) current usage. The autoscaling module 310 may can decide either to launch a new cluster or add more nodes to an existing cluster (possible only up to a maximum number of nodes) based at least in part on predicted query requirements and currently available spare capacity across all clusters. Typically, a cluster is autoscaled by the autoscaling module 310 to its maximum size first, before launching a new cluster.

Scheduler 315 may be responsible for allocating resources to a query. The scheduler 315 may be responsible for: (i) allocation of an EC to a query; (ii) maintain different queues; (iii) preemption of queries; (iv) reservation of resources for queries; and (v) provide fair share of resources based on promises of different queues.

The query submitter 320 may submit queries on an EC once resources are allocated for that query by Scheduler 315. The query submitter 320 may update the status of the query to Submitted EC, and provide details of EC to client. Accordingly, client may ping EC for further progress of query. The query expirer 325 may be responsible for killing queries that are running for more than a configured duration.

The CBO List Manager 330 may be a collection of CBOs in the memory of WFM 300. The CBO List Manager 33 may comprise a list of both valid and invalid (e.g., decommissioned) CBOs. It may be the responsibility of the CBO List Manager 330 to prevent invalid CBOs from connecting to WFM 300.

The CBO liveliness monitor 335 may keep track of each CBO and its last heartbeat time. Any CBO that does not produce a heartbeat within a configured time interval may be deemed lost and is expired by WFM 300. All running queries on that CBO may then be rescheduled on different CBO. No new queries may be scheduled on that CBO. A notification/alert may be triggered by the CBO liveliness monitor 335 to manually investigate that CBO.

The CBO Tracker Service 340 may be responsible for responding to heartbeats from all CBOs. Each CBO periodically sends a heartbeat to WFM 300, and the CBO Tracker Service 340 may be responsible for: (i) registering new CBOs; (ii) accepting heartbeats from already registered heartbeats; (iii) maintaining state of all CBOs in WFM 300; (iv) ensuring that only valid CBOs can communicate with WFM 300; and/or (v) forward relevant information to Scheduler 315 for making scheduling decisions. The CBO client may be part of the WFM 300 that operates on each CBO. This component may be responsible for (i) registration of CBO to WFM 300; (ii) sending regular heartbeat with relevant information to WFM 300; (iii) keeping track of health of CBO and update WFM 300 accordingly.

The Execution Cluster Liveliness Monitor 351 may keep track of each EC and its last heartbeat time. Any EC that does not produce a heartbeat within a configured time interval may be deemed lost and is expired by the workflow manager 300. All running queries on that EC may be marked as failed/rescheduled. No new queries may be scheduled on that EC. A notification/alert may be triggered to manually investigate that EC by the ECLivelinessMonitor 351.

The EC List Manager 352 is a collection of ECs in the workflow manager 300 memory. It may contain a list of both valid and invalid (e.g., decommissioned) ECs. The EC List Manager 352 may be responsible to prevent invalid ECs from connecting to the workflow manager 300. An EC client may also be part of a workflow manager 300, may operate on each EC master, and may be responsible for: (i) registration of EC to the WFM 300; (ii) sending regular heartbeat with relevant information to WFM 300; and (iii) keeping track of health of cluster and update WFM 300 accordingly.

The workflow manager 300 may receive a periodic heartbeat from an Execution Cluster. The ECTrackerService 353 may be responsible for responding to heartbeats from all ECs. The ECTrackerService 353 may be responsible for (i) registering new ECs: (ii) accepting heartbeats from already registered heartbeats; (iii) maintaining state of all ECs in the workflow manager 300; (iv) ensuring that only valid ECs can communicate with the workflow manager 300; and (v) forward relevant information to Scheduler 315 for making scheduling decisions.

The admin service 360 may have a higher priority than client service 370. The admin service 360 may be used to make administrative requests (by admins) such as, but not limited to: (i) exposing info about user and queue statistics; (ii) adding/removing ECs manually; (iii) adding/removing CBOs manually; and/or (iv) adding/removing users from queues.

The client service 370 may handles all communication to WFM 300 from clients including, but not limited to, operations comprising: (i) query submission; (ii) cancelling of queries; and/or (iii) polling for query status.

The web server 380 may comprise a web application for checking the status of the workflow manager 300. The web server 380 may allow a user to determine, for the workflow manager 300, (i) active/unhealthy/GD/decommissioned EC count; (ii) active/unhealthy/GD/decommissioned CBO count; (iii) number of running queries in each queue; (iv) number of pending queries in each queue; (v) number of killed queries; (vi) number of successful queries; (vii) number of failed queries; (viii) active number of users; (ix) running commands per EC; and/or (x) running commands per CBO.

In accordance with some embodiments of the present invention, methodologies for handling queries without resource predictions may be taught. In some circumstances, it may be possible that the resource estimator is unable to come up with the correct resource estimates for a given query. For example, if the table statistics are not available for the tables being queried or if there is no historical usage information such inaccuracies may occur. In such scenarios, the system may allocate a random initial prediction (for example 2 GB) for such queries and schedule them based on this prediction. The system may then add a feature in Presto Master in execution clusters which may enable it to automatically kill or terminate the query once its resource consumption breaches that initial prediction. The query may then be retried with a higher prediction value and upon breaching that second prediction, master node may again kill the query. Eventually, query is retried for one last time with the maximum resource limit that is allowed in the system.

It is important to note how a SLA may be provided (and at least to some extent, guaranteed), through the steps of (i) preemption, (ii) delayed scheduling, (iii) autoscaling, (iv) assigning default SLAs when estimates are not available, (v) maintaining spare capacity, and (vi) protecting against underestimation. Notably, such SLA's may be provided (and to at least some extent, guaranteed) even in a multitenant environment or with resource isolation.

More specifically, preemption may be accomplished by preempting one or more lower SLA queries to make space for higher SLA queries if there is not enough spare capacity in the system to schedule the higher SLA queries. Lower SLA queries may be delayed in scheduling up to a predefined wait time, until a required capacity become available in the system. Autoscaling may be accomplished through an addition of one or more nodes to an existing cluster, or by launching a new cluster based at least in part on the SLA level of the query, expiry of wait times for deferred queries, and existing spare capacity.

Default SLAs and resource quotas may be assigned to queries for which a resource usage may not be predicted. Such queries may be retried with a higher resource quota if the queries fail in the first attempt. Multi-tenancy and isolation may be ensured at least in part by providing each user access to its separate metastore dynamically using credentials passed with each query. Spare capacity may be proactively maintained based on real-time, or substantially near real-time, observations of resources used in the system to reduce wait time for scheduling of incoming queries. Underestimation of resources may be prevented or protected against by the cost based optimizer (CBO) avoiding scheduling queries on clusters that may report high resource utilization.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A system for scheduling interactive database queries from multiple tenants onto a distributed query processing system, while providing service level agreements and assurances, the system comprising:
    a workflow manager;
    a resource estimator cluster;
    one or more execution clusters providing a heartbeat comprising resource usage information of the one or more execution clusters to the workflow manager; and
    one or more metastores;
    the workflow manager in communication with the resource estimator cluster and the one or more execution clusters.

2. The system of claim 1, wherein the one or more execution clusters are scaled by the workflow manager as part of a schedule or autoscaled based on workload.

3. The system of claim 1, wherein the workflow manager is configured to send a query to the resource estimator cluster and receive a resource estimate.

4. The system of claim 1, wherein the resource estimator cluster is in communication with the one or more metastores.

5. The system of claim 1, wherein the workflow manager comprises an active node and a passive node.

6. The system of claim 1, further comprising a data store of historical resource consumption, comprising query and resource history, and wherein the resource estimator cluster is in communication with the datastore of query and resource history.

7. The system of claim 1, wherein the workflow manager is configured for interaction with a user.

8. A system for scheduling interactive database queries from multiple tenants onto a distributed query processing system, while providing service level agreements and assurances, the system comprising:
    a workflow manager comprising an active node and a passive node, configured to send a query to a resource estimator cluster and receive a resource estimate;
    the resource estimator cluster in communication with the workflow manager;

one or more execution clusters scaled by the workflow manager as part of a schedule or autoscaled based on workload, the one or more execution clusters providing a heartbeat comprising resource usage information of the one or more execution clusters to the workflow manager; and one or more metastores.

9. The system of claim 8, wherein the resource estimator cluster is in communication with the one or more metastores.

10. The system of claim 8, further comprising a data store of historical resource consumption, comprising query and resource history, and wherein the resource estimator cluster is in communication with the datastore of query and resource history.

11. The system of claim 8, wherein the workflow manager is configured for interaction with a user and provides to the user service level assurances.

12. A method of scheduling and handling interactive database queries with service level assurances (SLAs) in a multi-tenant system, the method comprising:

when there is not enough spare capacity in the multi-tenant system to schedule higher SLA queries, pre-empting one or more lower SLA queries to make space for and schedule the higher SLA queries;

delay scheduling the preempted lower SLA queries up to a predefined period of time, until a required capacity become available;

autoscaling the multi-tenant system, either through an addition of one or more nodes to an existing cluster, or by launching a new cluster based at least in part on a SLA level of a query, expiry of wait times for deferred queries, and/or existing spare capacity;

assigning a default SLA level and default resource quota to queries for which a resource usage may not be predicted, and retrying such queries for which a resource may not be predicted if they fail;

ensuring multi-tenancy and isolation by providing each user with access to the user's separate metastores using credentials;

maintaining spare capacity based on observations of resources to reduce wait time for scheduling of incoming queries; and protecting against underestimation of resources required by a cost-based optimizer (CBO) avoiding scheduling queries on clusters which report high resource utilization.

* * * * *